ବ2,884,392

Patented Apr. 28, 1959

2,884,392

ALKYLENE BIS STEARAMIDE-SYNTHETIC RUBBER COATING COMPOSITION

George A. Clark, Villa Park, and Henry W. Raisch, Jr., Oak Park, Ill., assignors to American Can Company, New York, N.Y., a corporation of New Jersey No Drawing. Application June 26, 1956
Serial No. 593,797

5 Claims. (Cl. 260—28.5)

The present invention pertains to a coating composition for the interior surface of sheet metal cans. More particularly the invention pertains to a coating composition for the interior surface of sheet metal cans having certain characteristics which prevent the adhesion of proteinaceous or meaty materials thereto, which coating comprises a synthetic wax and a rubber.

The word "meat" as used hereinafter is meant to include edible, proteinaceous materials such as flesh meat, e.g. pork, ham, beef, fowl, etc., and fish, either in a pure state or admixed with a bodying agent such as cereal.

The usual practice in the canning of meat is to pack the meat into a sheet metal can tightly so that the meat conforms generally to the shape and contour of the can. Thereafter, the can is closed, sealed and processed such as by immersion in hot water steam for a predetermined period of time and temperature.

In this process of tightly packing and processing the meat in the can, the meat has a tendency to adhere to the interior surface of the can with which it is in contact. Because of this, difficulty is experienced in removing the meat from the can; and patches of meat which remain stuck to the walls of the can, are torn from the surface of the meat. These occurrences are annoying, wasteful and hazardous to the ultimate consumer of the packed product.

It is therefore an object of the present invention to provide a coating composition that when applied to the interior surface of a sheet metal can into which meat is packed, will prevent the adhesion of the meat to the can surface after the meat is processed in the can regardless of how tightly the meat is packed into the can.

Another object of the invention is to provide an antistick coating composition for the interior surfaces of a sheet metal can which is non-toxic, taste- and odor-free and has no adverse effects on the canned meat with which it is in contact.

Numerous other objects and advantages of the invention will be apparent as it is better understood from the following description which is of a preferred embodiment thereof.

We have found that the above and other objects can be accomplished by providing the interior surfaces of a sheet metal can into which meat is to be packed with an adhesion preventing coating comprising an alkylene bis-stearamide, synthetic wax and a synthetic rubber.

The alkylene bis-stearamide is the essential ingredient of the adhesion-preventing or anti-stick composition of the present invention. Synthetic amide waxes in which the alkylene group contain from 1 to 3 carbon atoms and a melting point of at least 240° F. have been most satisfactory. Specifically, these compounds are methylene bis-stearamide, ethylene bis-stearamide, propylene-1,2, bis-stearamide and propylene-1,3, bis-stearamide, with the methylene and ethylene bis-stearamides being preferred.

The rubber component of the no-stick composition must be non-toxic, must impart no odor or taste to the product in contact therewith. It must also be soluble in volatile, organic solvents which in the resultant dry film will impart no odor, taste or toxicity to the product. Because of the non-adhering nature of the synthetic amide wax, the rubber component must have adherence to the metal surface of the can or any organic coating thereon but at the same time must not cause adhesion between the anti-stick coating and the canned meat. The two rubbers which have been found to produce simultaneously these somewhat opposite results are an elastomeric copolymer of isobutylene and a small percentage of a diene, usually butadiene, known commercially as Butyl rubber and Pliolite. Pliolite is the commercial trade name given to a rubber derivative made by refluxing a high grade, low protein content rubber in benzene in the presence of chlorostannic acid or an amphoteric metal halide such as stannic chloride, ferric chloride, boron fluoride, etc. The formation of these rubber derivatives are described in United States Patents 1,751,817; 1,797,188; and 1,8496,247. Anti-stick coatings containing the amide wax and Pliolite rubber are preferred.

The ratio of amide wax to rubber may be varied over a fairly wide range and still obtain a satisfactory anti-stick effect. This ratio is in the range of, by weight, 3 parts amide wax to 1 part rubber to 1 part amide wax to 3 parts rubber, with a weight ratio of 1 to 1 being preferred. The finished, dry coating must have a melting or softening point of at least 200° F. so as to remain solid at meat processing temperatures.

In the preparation of the coating composition, the synthetic amide wax is first uniformly dispersed in a volatile organic solvent. This may be accomplished in any suitable manner well known in the art, such as by ball milling the wax in the presence of the solvent over an extended period of time, e.g. 5 to 20 hours, or by passing the wax and solvent through a colloid mill for a period of time, e.g. ½ to 2 hours. It is necessary that the particles of wax, since they are insoluble in the organic solvents used, be very finely divided and uniformly dispersed throughout the solvent. If this condition is not met, the resulting liquid coating composition has an unstable viscosity thereby exhibiting a tendency to gel; and/or the final coating applied to the plate will be grainy.

Although the rubber component can be dissolved at the same time as the dispersing of the wax, it is preferred to dissolve the rubber in the solvent separately. Since the rubber is soluble in the solvents used, it is necessary only to mix the rubber in solvent and agitate the mixture until solution occurs. Thereafter, the solution of rubber in solvent is combined with the dispersion of the wax in the same or compatible solvents.

Any solvents in which the rubber component is soluble, which, in the resultant dry film, impart no odor, taste or toxicity to the product, and which may be substantially completely removed during the drying of the coating may be used in the instant invention. The solvents found most suitable in the instant invention are aliphatic and aromatic hydrocarbon solvents and mixtures thereof. The amount of solvent used may be varied over relatively wide limits depending upon the methods by which the coating is to be applied to the metal forming the can and upon the amount of finished, dry coating it is desired to have on the surface of the can. The method of application influences the amount of solvent because upon it depends the viscosity of the liquid coating which in turn is a function of the ratio of solids to solvent.

In the instant invention it is preferred to have the solvent constitute about 80% by weight of the liquid coating and the wax-rubber solids constitute the remaining 20% by weight. The liquid coating can be applied in any desired manner such as by roller coating, spraying, brushing, etc. However the method of application preferred is to roller coat the fluid composition onto the surface of flat metal sheets, which sheets are then passed through an oven to remove the solvent from the coating, and thereafter fabricate the sheets into metal cans with their coated surfaces forming the interior of the can.

Satisfactory meat release has been obtained with cans having on the interior surfaces thereof a relatively wide range of anti-stick coating. Dry coating weights in range of 0.1 milligram per 4 square inches of can surface to 4 milligrams per 4 square inches have been found satisfactory. Optimum meat release has been obtained, and is therefore preferred, using a drying coating weight of about from 0.5 to 2 milligrams per 4 square inches of interior can surface. Amounts greater than this may be used but no improvement in meat release is obtained to warrant the increased expense.

The following example is by way of explanation only and is not to be construed as a limitation on the invention.

Into an Eppenbach type colloid mill was placed 8 pounds of ethylene bis-stearamide (Acrawax C) in a finely granulated form and 36 pounds of a mixed aromatic, aliphatic hydrocarbon solvent. This charge was treated in the colloid mill for about ½ hour. To this treated charge was added a solution of 12 pounds of Pliolite rubber and 44 pounds of the aromatic-aliphatic hydrocarbon solvent. This complete batch was then treated for an additional ½ hour in the colloid mill during which time its temperature was raised to about 70° C. due to the frictional forces of the treatment.

The sample was then allowed to cool to room temperature and was found to have a viscosity of 45 seconds Canco cup. Examination under a microscope showed good dispersion of the wax in the solvent.

This liquid composition was roller coated onto one surface of a metal sheet, which sheet was passed into an oven and was maintained at a temperature of 250° F. for 6 minutes to evaporate all of the solvent thereby providing the sheet with a dry, solid, adhesion-preventing coating. Sufficient liquid coating was applied to the sheet to provide a dry, finished coating of about 2 milligrams per 4 square inches of surface.

A number of cans having the coating of the instant invention on the interior surfaces thereof were packed with meat, hermetically sealed and processed for 90 minutes at 240° F. The same number of cans having the commercial anti-stick coating of lard and cans having no anti-stick coating on their interior surfaces were similarly treated. In ease of removal from the cans and lack of adhesion of the meat to the interior surfaces of the cans, the cans coated with the rubber-wax composition of the instant invention rated very good to excellent in both respects, whereas the uncoated cans rated poor and the lard coated cans merely fair to good in each respect.

It is thought that the invention and many of its attendant advantages will be understood from the foregoing description, and it will be apparent that various changes may be made in the matter of the ingredients, their identity and their proportions without departing from the spirit and scope of the invention or sacrificing all of its material advantages, the form hereinbefore described being merely a preferred embodiment thereof.

We claim:

1. A coating composition for the interior surface of a metal container to prevent the adhesion of meat thereto comprising 25% to 75% by weight of an alkylene bis-stearamide synthetic wax in which the alkylene group contains from 1 to 3 carbon atoms, and from 75% to 25% by weight of a synthetic rubber selected from the group consisting of an isobutylene-diolefin copolymer and an elastomer formed by refluxing rubber in the presence of a member of the group consisting of chlorostannic acid and a halide of an amphoteric metal.

2. The composition set forth in claim 1 wherein said alkylene bis-stearamide is selected from the group consisting of methylene bis-stearamide and ethylene bis-stearamide.

3. The composition set forth in claim 1 wherein said rubber is an elastomeric copolymer of isobutylene and a small percentage of butadiene.

4. The composition set forth in claim 1 wherein said rubber is a product formed by refluxing rubber in the presence of a member of the group consisting of chlorostannic acid and a halide of an amphoteric metal.

5. A coating composition for the interior surface of a metal container to prevent the adhesion of meat thereto comprising, 50% by weight of ethylene bis-stearamide and 50% by weight of a rubber derivative which is a product resulting from heating rubber in the presence of a member of the group consisting of chlorostannic acid and a halide of an amphoteric metal.

References Cited in the file of this patent

UNITED STATES PATENTS

| | | |
|---|---|---|
| 2,337,666 | Koonz et al. | Dec. 28, 1943 |
| 2,600,943 | Van Valkenburgh | June 17, 1952 |
| 2,658,052 | Signer et al. | Nov. 3, 1953 |